United States Patent [19]

Klein

[11] 3,905,021

[45] Sept. 9, 1975

[54] CIRCUIT ARRANGEMENT FOR INTERPRETING THE CONTENT OF A REGISTER AS AN INSTRUCTION

[75] Inventor: Friedrich Klein, Rothenbach, Peg, Germany

[73] Assignee: Diehl datensysteme G.m.b.H., Nurnberg, Germany

[22] Filed: Jan. 12, 1973

[21] Appl. No.: 323,269

[30] Foreign Application Priority Data

Jan. 14, 1972 Germany ............................ 2201754

[52] U.S. Cl. ............................................. 340/172.5
[51] Int. Cl.$^2$ ............................................ G06F 9/06
[58] Field of Search ........................ 340/172.5; 445/1

[56] References Cited

UNITED STATES PATENTS

| | | | |
|---|---|---|---|
| 3,524,169 | 4/1970 | McAuliffe et al. | 340/172.5 |
| 3,609,669 | 9/1971 | Weiss | 340/172.5 |
| 3,736,567 | 5/1973 | Lotan et al. | 340/172.5 |

*Primary Examiner*—Harvey E. Springborn
*Attorney, Agent, or Firm*—Spencer & Kaye

[57] ABSTRACT

A data processing system having a read-only memory storage unit also has a circuit arrangement for determining if at least part of the content of a first register of an arithmetic unit, which content results from a computing operation carried out in the arithmetic unit is to be interpreted as an instruction, based on the information currently stored in an instruction register, such information emanating from the read-only memory. A recognition device generates a signal when the current content of the instruction register is determined to indicate that the current content of the first register should be interpreted as an instruction. A switching circuit is connected between the first register and the instruction register. The output signal of the recognition device actuates the switching circuit which then enables the at least part of the content of the first register to be transferred to the instruction register, under the control of clock pulses. The instruction represented by the at least part of the content which is being transferred to the instruction register is not executed until this transfer process is completed.

5 Claims, 1 Drawing Figure

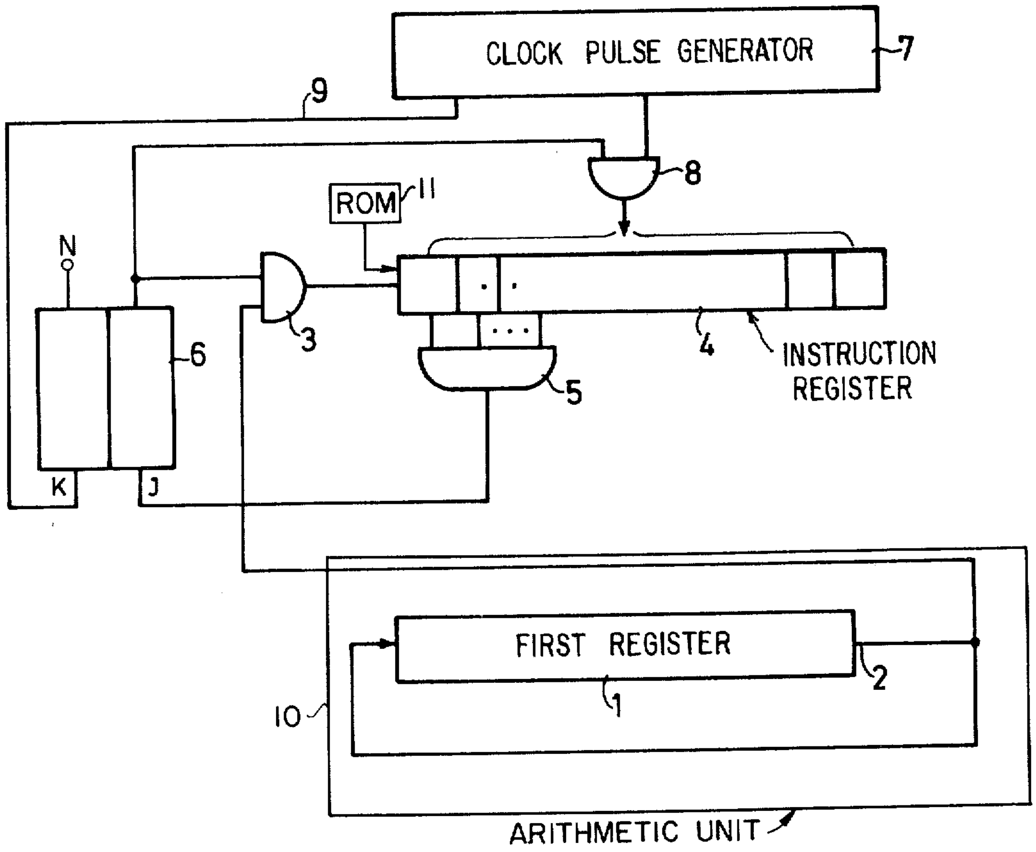
CLOCK PULSE GENERATOR
7
9
8
ROM
11
N
3
6
4
INSTRUCTION REGISTER
5
K
J
FIRST REGISTER
2
1
10
ARITHMETIC UNIT

CIRCUIT ARRANGEMENT FOR INTERPRETING THE CONTENT OF A REGISTER AS AN INSTRUCTION

BACKGROUND OF THE INVENTION

This invention relates to a circuit arrangement for interpreting as an instruction the content of a register of a data processing system having a stored program which cannot be written over, i.e. a read-only memory. Generally in prior known program-controlled data processing systems, so-called over-writable program stores are provided, which contain the instructions for the execution of the program.

If an instruction is to be carried out, it is transferred from the program store into an instruction register where it is then executed. However, if an instruction is only computed during the execution of an operation, then this computed instruction is usually stored in the program store, to be recalled therefrom at a later time and transferred into the instruction register. This transfer of the instruction into the program store and its later reading out requires an expenditure of both additional computing time and additional structural elements, neither of which can be disregarded.

Most recently, set-value stores, i.e. Read Only Memories, which are commonly referred to as ROM-stores, have found greater favor in computer technology. Due to the ease with which ROM-stores can be readily interchanged, these stores are especially of interest for use in smaller data processing units. In these smaller processing units, it is thus possible to readily load the system in a relatively simple manner with another program, thus eliminating the need of having a relatively large program store unit for the reception of several programs.

SUMMARY OF THE INVENTION

An object of the present invention is to provide a circuit arrangement for use in data processing systems having ROM-stores, in which an instruction, preferably an instruction computed in an arithmetic unit, can be interpreted as such and can be executed.

According to the present invention, a circuit arrangement for the interpretation, as an instruction, of the content or a part of the content of a first register of data processing apparatus includes: an instruction register, which is designed as a shift register and which has an input connected to an output of the first register; a recognition device for determining if the initial data in the instruction register indicates that the content, or such a part of the content, of the first register is to be interpreted as an instruction and producing a signal whenever such is the case; a switching circuit which is actuated by the recognition signal and enables an output of the first register to be connected to an input of the instruction register; and a transfer device for transferring the content, or such part of the content, of the first register to the instruction register and providing timing signals for shifting this data within the instruction register as it is received. The switching circuit also blocks the execution of the content as it is received by the instruction register from the first register until the particular transfer process is completed. It has been suggested above that either the entire content or a part of the content of the first register may be interpreted as an instruction and transferred to the instruction register. In general, the nature of the word format employed will determine whether the entire content or a selected part of the content of the first register is to be so interpreted and transferred. Therefore, while for the sake of simplicity, reference will be made hereafter to "the content" of the first register, this is to be understood to refer to either the entire content or some selected part of the content of that register.

Such a circuit arrangement is especially advantageous in a data-processing system having a program store which cannot be over-written (i.e. ROM-store). The first register over-written, this circuit arrangement can be constituted by a register of an arithmetic unit of the data processing system.

The switching circuit can include a bistable flip-flop having its setting input connected to a logical gate, which constitutes the recognition device and responds to an initial instruction from the instruction register that the content of the first register is to be interpreted as an instruction, and a first AND-gate having a first input connected to an output of the bistable flip-flop. A second input of this first AND-gate is connected to an output of the first register and the output of this gate is connected to the instruction register. Consequently, when the bistable flip-flop actuates the gate, the content of the first register can be transferred to the instruction register. If the content of the first register is continuously being circulated within the register, for example via a feedback path, then the data bits contained therein are continuously being delivered to the first AND-gate so that when this gate is opened the contents are automatically transferred to the input of the instruction register.

The output of the bistable flip-flop is also connected to a first input of a second AND-gate, with timing signals applied to a second input of the second AND-gate for the period during which the transfer of the required content of the first register into the instruction register is to be effected. The output of this second AND-gate is connected to timing inputs of the instruction register thereby producing shifting pulses so that the data bits received by the instruction register can be shifted therein thus allowing for transfer of the contents from the first register to the instruction register.

A resetting input of the bistable flip-flop is connected to a timing line for receiving a resetting signal at the completion of the transfer process.

BRIEF DESCRIPTION OF THE DRAWING

The single FIGURE shows a block diagram of a circuit arrangement according to the present invention.

DESCRIPTION OF THE PREFERRED EMBODIMENT

Referring to the circuit arrangement shown in the FIGURE, a first register 1 in an arithmetic unit 10 of a data processing system is designed as a circulating shift register. The output 2 of the register 1 is connected to one of the inputs of an AND-gate 3, the output of which is applied to an input of an instruction register 4. A read-only memory 11 is connected to instruction register 4 as shown in the FIGURE. This instruction register 4, which is constituted by a shift register, has as many storage places as the number of bits in an instruction, which for example can be 16, thus the instruction register 4 would have 16 flip-flops. A logic gate 5, forming a recognition circuit, is connected to selected outputs of the instruction register 4, which ıtputs can consist of a set of individual outputs in the struction register 4. Logic gate 5 compares the data ts from instruction register 4 with a predetermined bit ıttern, which for example corresponds to the instruc- ›n "Execute" just previously delivered to register 4 ›m a word location of read-only memory 11. If the ıta bit patterns match then a signal is generated indi- ıting that the content of the register 1 should be trans- rred into the instruction register 4. The output of the gic gate 5 is connected to the setting input of a JK bis- ble flip-flop 6, the output of which is connected to the cond input of the AND-gate 3.

During each 16-pulse word period, a clock pulse gen- ·ator 7 imparts timing signals to an AND-gate 8, the ıtput of which is connected to the timing inputs of ıch of the 16 flip-flops of the instruction register 4. he second input of this AND-gate 8 is connected to ıe output of the flip-flop 6. Finally, a timing reset line leads from the clock signal generator 7 to the reset- ng input of the flip-flop 6, to transmit a signal for re- :tting the flip-flop 6 at the last bit-time of a word, i.e. t the sixteenth bit time.

The operation of the above circuit arrangement will e explained below. Let it be assumed that the logic ate 5 recognizes, from the data bits at the selected out- uts of instruction register 4, that next the instruction Execute" is to be carried out. The logic gate 5 pro- uces an output signal which sets the bistable flip-flop to "1", which causes the flip-flop 6 to produce an en- bling signal which is applied to the second input of the ‹ND-gate 3. Now the content of the register 1 is trans- :rred from the register 1 via the AND-gate 3 to the ıput of the instruction register 4. Simultaneously, the ‹ND-gate 8, which has its output connected to the tim- ng inputs of the instruction register 4, is enabled by the ›utput pulse of the flip-flop 6. At the beginning of a vord period, the corresponding timing pulses are gen- :rated by the clock pulse generator 7 and fed to the econd input of the AND-gate 8 which thus provides he timing pulse to the inputs of instruction register 4. These timing pulses enable the data being fed to the in- ›truction register to be shifted along the chain of stor- ıge places. The previous instruction is pushed out bit- vise and the content of the register 1 is fed bit-wise into he instruction register 4. Through the set state of the lip-flop 6, execution of the instruction entering the in- ›truction register 4 is prevented during the transferring ›rocess. This prevention is effected in that a negated ›utput N of the flip-flop 6 is connected to all the other :ommand lines, (not shown in the exemplified embodi- nent in the FIGURE) coming from corresponding fur- :her AND-gates. After the last bit-time, i.e. the six- :eenth bit-interval of a word-period, the content of the :egister 1 has been completely transferred to the in- ›truction register 4 and the transfer process is con- :luded. Simultaneously there is fed via the timing line 9 to the resetting input of the flip-flop 6 a signal which resets this flip-flop into its initial state. Now, during a subsequent word period, the execution of the instruc- tion can be carried out in the instruction register 4 in the usual manner.

A circuit according to the invention can be utilized in a number of known data processing systems. For example, it can be incorporated in U.S. Pat. No. 3,391,394, issued to Ottaway et al. which is dated 07/02/68.

It will be understood that the above description of the present invention is susceptible to various modifications, changes and adaptations, and the same are intended to be comprehended within the meaning and range of equivalents of the appended claims.

What is claimed is:

1. For use in a data processing apparatus including a read-only memory and a first register, a circuit arrangement for interpreting at least part of the current content of the first register as an instruction, the circuit arrangement comprising, in combination: an instruction shift register having a plurality of stages and connected to the read-only memory; recognition means coupled to selected stages of said instruction register for comparing data currently stored in said selected stages of said instruction register for producing an output signal whenever said data indicates that said at least part of the current content of said first register is to be interpreted as an instruction; switching means connected to the output of said recognition means for producing a signal enabling such part of the content of said first register to be transferred to said instruction register in response to said output signal of said recognition means; and transfer means connected to said switching means and connected between an output of said first register and an input of said instruction register for causing such part of the content of said first register to be transferred to said instruction register in response to the production of said signal by said switching means; said switching means providing an output signal for blocking the operation of the data processor under control of said transferred part content until such transfer is completed.

2. A circuit arrangement as defined in claim 1, wherein said first register is part of an arithmetic unit.

3. A circuit arrangement as defined in claim 1, wherein said switching means is a bistable means, and said transfer means include an AND-gate having a first input connected to the output of said first register, said AND-gate having a second input connected to receive the enabling signal output from said bistable means, and said AND-gate having an output connected to the input of said instruction register for providing a path for transferring said at least part of the content of said first register to said instruction register.

4. A circuit arrangement as defined in claim 3, wherein said transfer means includes timing means for producing timing pulses and a second AND-gate having a first input connected to said timing means for receiving such timing signals, said second AND-gate having a second input connected to receive the enabling signal output from said bistable means, and said second AND-gate having an output connected to said instruction register for applying the timing pulses to the individual stages of said instruction register for causing the shifting through said instruction register of said at least part of the content received from said first register for the period during which transfer from said first register to said instruction register occurs.

5. A circuit arrangement as defined in claim 4, wherein said timing means further provides a resetting signal to a second input of said bistable means for resetting said bistable means after the transfer of the at least part content is completed.

* * * * *